United States Patent [19]

Kato et al.

[11] Patent Number: 5,303,094
[45] Date of Patent: Apr. 12, 1994

[54] APPARATUS FOR RECORDING AND/OR REPRODUCING DIGITAL AND ANALOG MAGNETIC TAPE SIGNALS WITH A/D AND D/A CONVERTERS

[75] Inventors: Yasuo Kato, Kanagawa, Japan; Gerardus C. P. Lokhoff, Eindhoven, Netherlands

[73] Assignee: U.S. Philips Corporation, New York, N.Y.

[21] Appl. No.: 936,147

[22] Filed: Aug. 26, 1992

[30] Foreign Application Priority Data

Aug. 30, 1991 [JP] Japan ................................. 3-76801
Aug. 30, 1991 [JP] Japan ................................. 3-76802
Aug. 30, 1991 [JP] Japan ................................. 3-76803

[51] Int. Cl.⁵ .......................... G11B 5/00; G11B 5/09; G11B 15/12
[52] U.S. Cl. .......................................... 360/32; 360/61
[58] Field of Search ...................... 360/32, 60, 61, 63, 360/64, 13, 15

[56] References Cited

U.S. PATENT DOCUMENTS

| | | | |
|---|---|---|---|
| 4,851,934 | 7/1989 | Takeuchi et al. | 360/64 |
| 5,021,893 | 6/1991 | Scheffler | 360/32 X |
| 5,097,364 | 3/1992 | Goto et al. | 360/32 |
| 5,130,864 | 7/1992 | Shimada | 360/60 |

FOREIGN PATENT DOCUMENTS 0381266 1/1990 European Pat. Off. .

*Primary Examiner*—Donald Hajec
*Assistant Examiner*—Patrick Wamsley
*Attorney, Agent, or Firm*—John C. Fox

[57] ABSTRACT

In an arrangement for reproducing standard analog audio compact cassettes and digital compact cassettes is provided with an analog output terminal (9) for supplying an analog audio signal obtained from reproducing a digital audio signal from a digital compact cassette, or an analog signal from a standard compact cassette. The analog reproducer (28) is coupled to the analog output terminal (9) via an A/D converter (20) and a D/A converter (13). A further measure that can be used separate or in combination with the previous measure, is that a digital output terminal (23) is provided and that the output of the analog reproducer is coupled to the digital output terminal (23) via an A/D converter (13).

7 Claims, 1 Drawing Sheet

APPARATUS FOR RECORDING AND/OR REPRODUCING DIGITAL AND ANALOG MAGNETIC TAPE SIGNALS WITH A/D AND D/A CONVERTERS

BACKGROUND OF THE INVENTION

1. Field of the Invention

This invention relates to an apparatus for receiving a magnetic tape accommodated in a cassette, comprising a digital-signal reproducing part, an analog-signal reproducing part, an analog-signal output terminal and first switching means for coupling the analog-signal output terminal either to an output of the analog-signal reproducing part or via a D/A converter to an output of the digital-signal reproducing part.

Such an apparatus, described in EP 381 266 A1 (PHN 12.816 C), is capable of reproducing either analog-audio signals from a standard audio compact cassette or digital-signals from a digital compact cassette (DCC). Such apparatuses can be used in car radios, where preferably only the analog or digital reproduction facilities of the apparatus is required.

Apparatuses for home-use are however additionally provided with a digital recording facility, so as to record audio signals, in analog or digital form, on the record carrier included in a digital compact cassette. In that case, an A/D converter is provided for converting the analog audio signal into a digital audio signal so as to enable recording on a digital compact cassette.

SUMMARY OF THE INVENTION

The invention aims at simplifying the production of the various apparatuses, such as, applied in a car radio or in a DCC home-recorder.

To that purpose, the apparatus in accordance with the invention is characterized in that the apparatus further comprises an A/D converter and that the apparatus is adapted to couple the output of the analog-signal reproducing part to the analog-signal output terminal via said A/D converter and said D/A converter, in the situation when the first switching means are switched so as to provide the coupling between the output of the analog-signal reproducing part and the analog-signal output terminal.

The invention is based on the following recognition. Manufacturers of apparatuses as previously described aim at reducing production costs by developing identical circuit constructions for various types of apparatuses. More specifically in apparatuses provided with a digital-signal recording and a reproduction part and an analog-signal reproduction part, such apparatus is provided with an A/D converter for converting the analog signal supplied to the apparatus into the digital domain so as to enable the signal to be recorded.

If, in such an apparatus, the output of the analog-signal reproducing part is coupled to the input of the A/D converter, and subsequently coupled via the D/A converter to the analog-signal output terminal, an analog selection switch can be left out. This lowers the production costs.

Selection between the signal reproduced by the analog-signal reproduction part and the signal reproduced by the digital-signal reproduction part can now be realized by the monitor switch, which is already normally present between the A/D converter and the D/A converter. Further, such a monitor switch, which is incorporated in the digital domain, can be realized more easily than analog switches.

As an additional advantage, coupling the output of the analog-signal reproducing part to the input of the A/D converter, offers the possibility to supply the analog signal after A/D conversion, to a digital-signal output terminal.

BRIEF DESCRIPTION OF THE DRAWING

The invention will now be described in more detail, with reference to the drawing in which.

DESCRIPTION OF THE PREFERRED EMBODIMENTS

Figure 1:
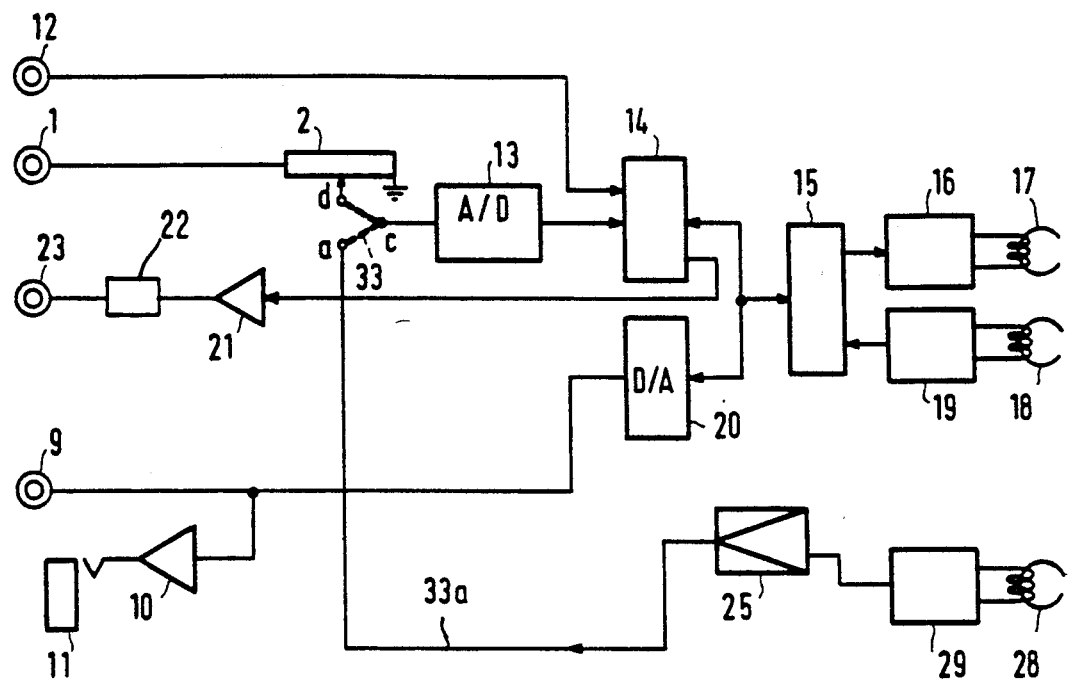
FIG. 1 shows a schematic diagram of a first embodiment of the invention.

FIG. 1 diagrammatically shows a circuit of a cassette tape recorder according to an embodiment of the present invention. In FIG. 1, an analog signal input terminal 1, a recording level adjuster 2, an analog signal output terminal 9, an amplifier 10, a head-phone terminal 11, a digital interface 14, a digital signal processor 15, a recording amplifier 16, a recording head 17, a reproduction head 18, a reproduction amplifier 19, a digital-to-analog converter 20, a buffer amplifier 21 and a digital signal output terminal 23.

Shown at 28 is an analog signal reproduction head which is connected to a reproduction amplifier 29. This amplifier is connected to the noise reduction circuit 25.

A signal change-over switch 33 is interposed between the input of the analog-to-digital converter 13 and the output of the noise reduction circuit 25. This switch 33 connects the noise reduction circuit 25 to the analog-to-digital converter 13 when a terminal c thereof is brought into contact with a terminal a of this switch, and connects the analog-to-digital converter 13 to the recording level adjuster 2 when the terminal c is brought into contact with another terminal d of this switch.

The operation of the above circuit will now be described. It is assumed here that the switch element 33 is now positioned so as to connect the terminals d and c with each other. In this case, an analog signal supplied to the analog signal input terminal 1 is subjected to a recording level adjustment at the recording level adjuster 2 and is fed to the digital interface 14 after converted into a digital signal in the analog-to-digital converter 13. The digital signal is converted into a standardized digital signal by this digital interface and is then supplied to the digital signal processor 15 wherein the signal is subject to necessary signal processing such as data conversion processing, interleaving and modulation processing. The thus processed digital signal is fed to the recording amplifier 16 and then recorded on a digital compact cassette tape through the recording head 17.

On the other hand, a digital signal fed to the digital signal input terminal 12 is directly supplied to the digital interface 14, which is then signal processed in the same way as described above and recorded on a digital compact cassette tape. To that purpose, the interface 14 comprises switching means so as to select either the analog or the digital input signal for recording.

The operation of this circuit in the reproduction mode will now be described.

(A) The case where a digital signal is to be outputted from the digital signal output terminal when reproducing an analog signal or a digital signal.

(1) When reproducing an analog signal, the switch 33 is positioned so as to connect the terminals a and c with each other. An analog signal detected by the reproduction head 28 from an analog compact cassette tape is supplied through the reproduction amplifier 29, the noise reduction circuit 25 and the signal change-over switch 33 to the analog-to-digital converter 13. The reproduced analog signal is converted into a digital signal in this converter and fed through the digital interface 14, the buffer amplifier 21 and the transformer 22 to the digital signal output terminal 23, from which the digital signal is supplied to an external device.

(2) When reproducing a digital signal, a digital signal detected by the reproduction head 18 from a digital compact cassette tape is fed through the reproduction amplifier 19, the digital signal processor 15, the digital interface 14 and the buffer amplifier 21 to the digital signal output terminal 23, from which the reproduced digital signal is supplied to an external device.

Thus, in either of the analog and digital reproduction modes, the reproduced signal can be outputted through the single signal circuit from the digital signal output terminal 23 as a digital signal.

(B) The case where an analog signal is to be outputted from the analog signal output terminal when reproducing an analog signal or a digital signal.

(1) When reproducing an analog signal, the switch 33 is positioned so as to connect the terminals a and c. An analog signal detected by the reproduction head 28 from an analog compact cassette tape is supplied through the reproduction amplifier 29, the noise reduction circuit 25 and the signal change-over switch 33 to the analog-to-digital converter 13 in which the reproduced analog signal is converted into a digital signal. This digital signal is fed through the digital interface 14 to the digital-to-analog converter 20 wherein the digital signal is converted into an analog signal, which signal is outputted from the analog signal output terminal 9.

(2) When reproducing a digital signal, switching means are provided so that a digital signal detected by the reproduction head 18 from a digital compact cassette tape and fed through the reproduction amplifier 19 and the digital signal processor 15 is applied to the digital-to-analog converter 20 wherein the digital signal is converted into an analog signal which is outputted from the analog signal output terminal 9.

Thus, in either of the analog and digital reproduction modes, the reproduced signal can be outputted through the single signal circuit from the analog signal output terminal 9 as an analog signal.

With this embodiment, in either of the analog and digital reproduction modes, a digital signal can be outputted from the digital signal output terminal 23 and an analog signal can be outputted from the analog signal output terminal 9. Therefore, when connecting this recorder to an audio amplifier the connection can be achieved by employing only either the analog signal circuit or the digital signal circuit. Thus, the connection is very simple.

In the above connection, since one of the analog and digital signal circuits is used as a common signal circuit in either of the analog and digital reproduction modes, there will be no difference in sound quality due to the kind of signal circuit.

Figure 2:
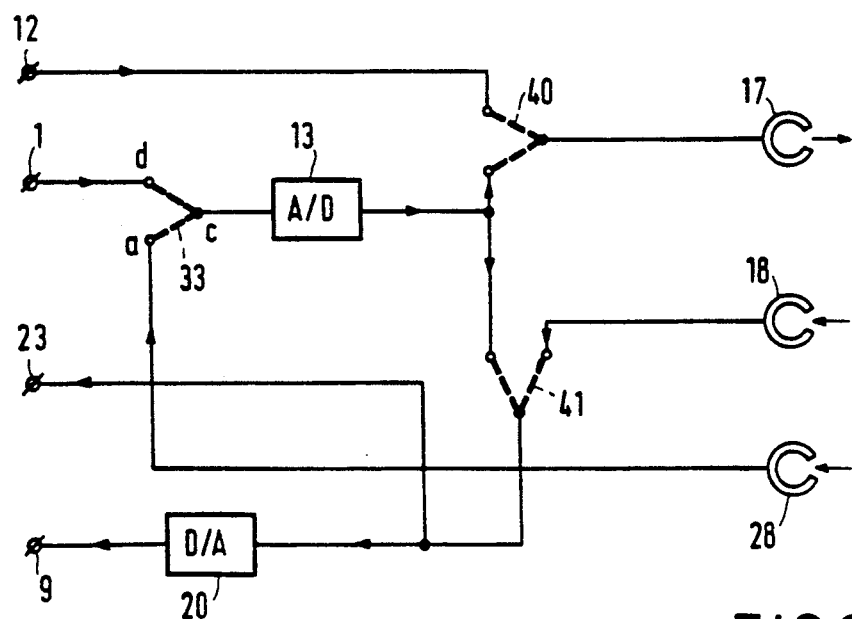
FIG. 2 shows a schematic diagram of a second embodiment of the invention.

FIG. 2 shows the apparatus more schematically. More specifically, all the switching means are shown more clearly. Switching means 40 is present so as to select either the digital input signal present at the input 12 or the digital output signal of the A/D converter 13. The switching means 41 is provided so as to select either the reproduced digital signal from the digital reproduction part including the head 18, or the digital output signal of the A/D converter 13.

It is to be noted here that the digital reproducing and recording part 15, 16, 17, 18 and 19, need not necessarily be provided with a separate recording head 17 and a separate reproducing head 18. The recording head 17 and the reproducing head can be combined into one recording/reproducing head.

Further, when applying the invention in an apparatus for use in a car radio, normally the digital recording facility will not be present. This means for the embodiment of FIG. 2 that the elements with reference numeral 1, 12, 17, 23 and 40, can be left out and that the switch 33 should be replaced by an electrical interconnection between a and c.

It is evident that, where appropriate, the apparatus can be provided with an analog-signal recording part, so as to enable the recording of an analog-signal applied to the analog-signal input terminal, or a digital signal after D/A conversion.

We claim:

1. An apparatus for receiving a magnetic tape accommodated in a cassette, the apparatus comprising a digital-signal reproducing part, an analog-signal reproducing part, an analog-signal output terminal and first switching means for selectively coupling the analog-signal output terminal to an output of the analog-signal reproducing part and via a D/A converter to an output of the digital-signal reproducing part, characterized in that the apparatus further comprises an A/D converter and in that the apparatus is adapted to couple the output of the analog-signal reproducing part to the analog-signal output terminal via said A/D converter and said D/A converter, in the situation when the first switching means is switched such so as to provide the coupling between the output of the analog-signal reproducing part and the analog-signal output terminal.

2. The apparatus as claimed in claim 1, characterized in that it comprises a digital signal recording part having an input and an output, a digital-signal input terminal, a digital-signal output terminal, an analog-signal input terminal, second switching means for selectively coupling the digital-signal input terminal and the analog-signal input terminal via the A/D converter to the input of the digital-signal recording part.

3. The apparatus as claimed in claim 2, characterized in that third switching means is provided so as to enable a selective coupling of an input of the A/D converter to the analog-signal input terminal and the output of the analog-signal reproducing part.

4. The apparatus as claimed in claim 3, characterized in that the digital-signal output terminal is selectively coupled via the first switching means to the output of the A/D converter and to the digital-signal reproducing part.

5. The apparatus as claimed in claim 2, characterized in that the digital-signal output terminal is selectively coupled via the first switching means to the output of the A/D converter and to the digital-signal reproducing part.

6. An apparatus for receiving a magnetic tape accommodated in a cassette, comprising a digital-signal reproducing part, an analog-signal reproducing part, an analog-signal output terminal, a digital-signal output terminal, first switching means for selectively coupling the analog-signal output terminal to an output of the analog-signal reproducing part and via a D/A converter to an output of the digital-signal reproducing part, characterized in that the apparatus further comprises an A/D converter and that second switching means are provided to selectively couple the digital-signal output terminal to the output of the analog-signal reproducing part via said A/D converter.

7. The apparatus as claimed in claim 6, characterized in that third switching means are provided so as to selectively couple the digital-signal output terminal to the output of the digital-signal reproducing part and to the output of the A/D converter.

* * * * *